United States Patent
Nishida

(10) Patent No.: US 10,762,343 B2
(45) Date of Patent: Sep. 1, 2020

(54) FORM TYPE LEARNING SYSTEM AND IMAGE PROCESSING APPARATUS

(71) Applicant: KYOCERA Document Solutions Inc., Osaka (JP)

(72) Inventor: Atsushi Nishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 37 days.

(21) Appl. No.: 16/221,477

(22) Filed: Dec. 15, 2018

(65) Prior Publication Data
US 2019/0188462 A1    Jun. 20, 2019

(30) Foreign Application Priority Data
Dec. 15, 2017 (JP) ................................. 2017-240285

(51) Int. Cl.
*G06K 9/62* (2006.01)
*G06K 9/00* (2006.01)
*G06T 3/40* (2006.01)

(52) U.S. Cl.
CPC ....... *G06K 9/00449* (2013.01); *G06K 9/6257* (2013.01); *G06K 9/6267* (2013.01); *G06T 3/40* (2013.01)

(58) Field of Classification Search
CPC ............. G06K 9/00449; G06K 9/6257; G06K 9/6267; G06T 3/40
See application file for complete search history.

(56) References Cited

U.S. PATENT DOCUMENTS

| 5,631,984 A * | 5/1997 | Graf ................... G06K 9/00449 382/317 |
| 6,778,703 B1 * | 8/2004 | Zlotnick ............ G06K 9/00449 382/218 |
| 2002/0062325 A1 * | 5/2002 | Berger .................... H04L 29/06 715/229 |
| 2012/0265575 A1 * | 10/2012 | Torii ................ G06Q 10/06311 705/7.15 |
| 2016/0148074 A1 * | 5/2016 | Jean ..................... G06F 16/5838 382/190 |
| 2016/0227069 A1 * | 8/2016 | Osawa ............... G06K 9/00442 |
| 2018/0181808 A1 * | 6/2018 | Sridharan .......... G06K 9/00449 |

FOREIGN PATENT DOCUMENTS

JP          2006229305 A       8/2006

* cited by examiner

*Primary Examiner* — Samir A Ahmed
(74) *Attorney, Agent, or Firm* — Hawaii Patent Services; Nathaniel K. Fedde; Kenton N. Fedde

(57) ABSTRACT

To accurately classify a form without using form layout information, the image processing apparatus utilizes a classifier that accepts a filled-in form whose image has been reduced into a specific size as an input and specifies the form type of the filled-in form. Machine learning has been performed to the classifier by a form type learning system and the form type learning system reduces an image of a filled-in form as an original document image, adds a noise to the original document image, which has not been reduced or has been reduced, to generate multiple images for machine learning, associates the form type of the original document image with the multiple images for machine learning as a label, and performs machine learning of the classifier using the multiple images for machine learning and the label as training data.

7 Claims, 4 Drawing Sheets

FIG. 2

STATEMENT

OCTOBER 10, 2017
XXX, CHUO-KU, OSAKA-SHI, OSAKA-FU
AAA CORPORATION

TO: BBB CORPORATION

| TOTAL AMOUNT | ¥30,000- |
|---|---|

| ITEM NO. | DESCRIPTION | UNIT PRICE | QUANTITY | AMOUNT |
|---|---|---|---|---|
| AA001 | ○○○ | 10,000 | 1 | 10,000 |
| AA002 | ○○○ | 20,000 | 1 | 20,000 |
| | | | | |
| | | | | |
| | | | | |
| | | | | |
| | | | | |
| | | | | |
| | | | TOTAL | 30,000 |

FORM TYPE LEARNING SYSTEM AND IMAGE PROCESSING APPARATUS

INCORPORATION BY REFERENCE

This application is based upon, and claims the benefit of priority from, corresponding Japanese Patent Application No. 2017-240285 filed in the Japan Patent Office on Dec. 15, 2017, the entire contents of which are incorporated herein by reference.

BACKGROUND

1. Field of the Invention

The present disclosure relates to a form type learning system and an image processing apparatus.

2. Description of Related Art

There has been a document management system in which the form of a document scanned by a digital multifunction peripheral is specified and the document is stored in a folder corresponding to the form.

SUMMARY

A form type learning system according to the present disclosure includes: an original document image acquiring unit that acquires an image of a filled-in form as an original document image; an image reducing unit that reduces the original document image; a noise adding unit that adds a noise to the original document image, which has not been reduced by the image reducing unit or has been reduced by the image reducing unit, to generate a plurality of images for machine learning; a label adding unit that associates a form type of the original document image with the plurality of images for machine learning as a label; and a machine learning processing unit that performs machine learning of a classifier using the plurality of images for machine learning and the label as training data. The classifier accepts an image of a filled-in form as an input and outputs a form type.

An image processing apparatus according to the present disclosure includes: a form image acquiring unit that acquires an image of a filled-in form; an image reducing unit that reduces the acquired image of the filled-in form into a specific size; and a classifier that accepts the reduced image of the filled-in form as an input and outputs a form type. Further, machine learning has been performed to the classifier by the above-described form type learning system.

BRIEF DESCRIPTION OF THE DRAWINGS

FIG. 2 is a diagram illustrating an example of a filled-in form to be used for machine learning of a classifier in FIG. 1;

DETAILED DESCRIPTION

Hereinafter, an explanation is given of an embodiment of the present disclosure, based on the drawings.

Figure 1:
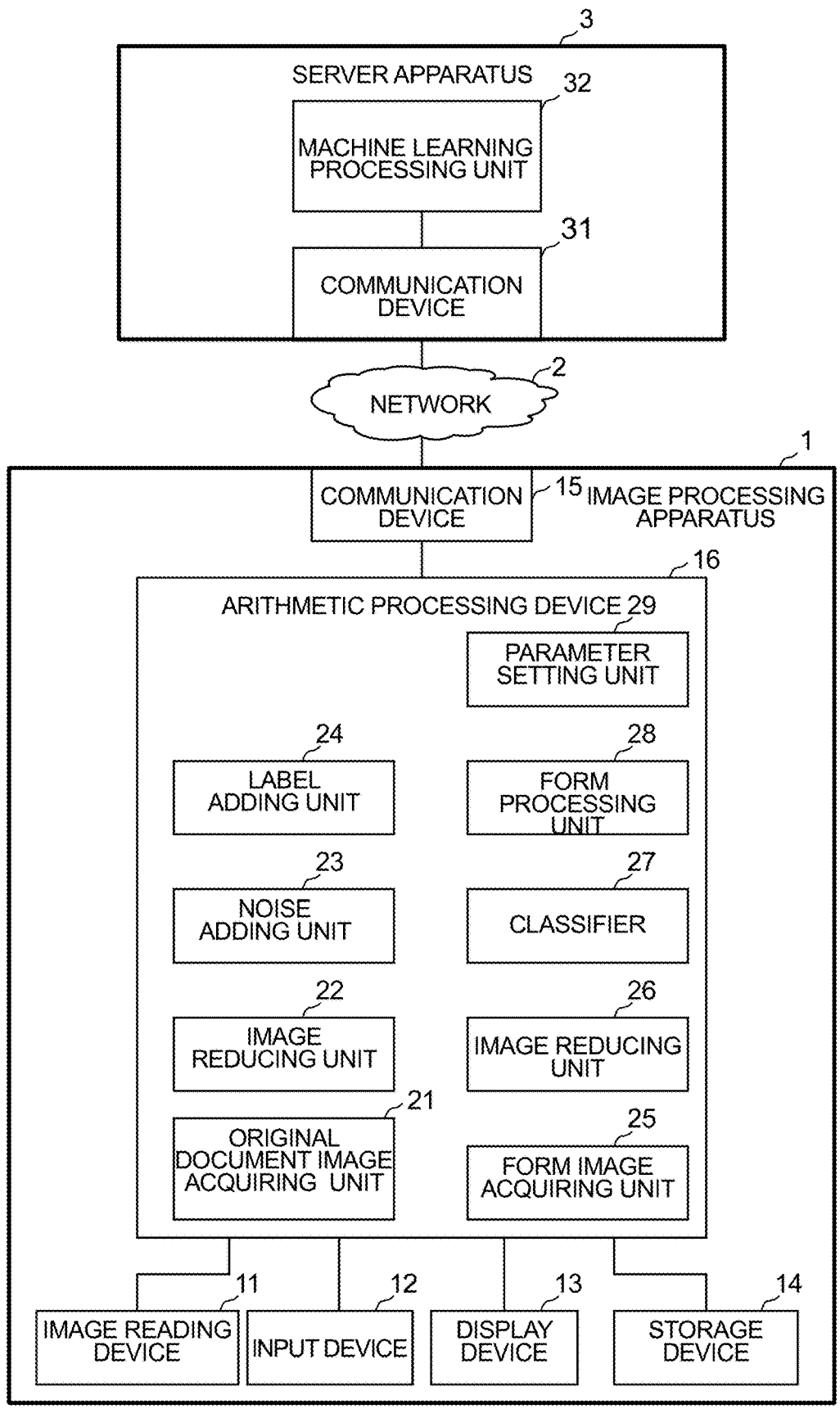
FIG. 1 is a block diagram illustrating a configuration of a form type learning system according to an embodiment of the present disclosure.

FIG. 1 is a block diagram illustrating a configuration of a form type learning system according to an embodiment of the present disclosure. In the system illustrated in FIG. 1, the image processing apparatus 1 communicates with the server apparatus 3 via the network 2.

The image processing apparatus 1 in FIG. 1 is, for example, an image forming apparatus such as a multifunction peripheral and includes an image reading device 11, an input device 12, a display device 13, a storage device 14, a communication device 15, and an arithmetic processing device 16.

The image reading device 11 optically reads an image of a document (here, a filled-in form) and generates image data of the image.

The input device 12 is a device such as a hard key or a touch panel, which detects a user operation and outputs information indicating a user operation. The display device 13 is a device such as a liquid crystal display, which displays various kinds of information for a user. For example, the input device 12 and the display device 13 are arranged on an operation panel installed on a housing surface.

The storage device 14 is a non-volatile storage device such as a hard disk or a flash memory.

The communication device 15 is a device such as a network interface, which is connected to the network 2 and performs data communication with another apparatus (such as the server apparatus 3).

The arithmetic processing device 16 includes a computer for executing various kinds of programs, an ASIC (Application Specific Integrated Circuit), and the like, and operates as various types of processing units using the computer, the ASIC, and the like.

Here, for machine learning of form types, the arithmetic processing device 16 operates as an original document image acquiring unit 21, an image reducing unit 22, a noise adding unit 23, and a label adding unit 24. Further, for classification of forms, the arithmetic processing device 16 operates as a form image acquiring unit 25, an image reducing unit 26, a classifier 27, a form processing unit 28, and a parameter setting unit 29.

The original document image acquiring unit 21 acquires, as an original document image, an image of a filled-in form to be used for machine learning of the classifier 27. In the present embodiment, the original document image acquiring unit 21 utilizes the image reading device 11 to acquire a form image read from a filled-in form.

FIG. 2 is a diagram illustrating an example of a filled-in form to be used for machine learning of the classifier 27 in FIG. 1.

The image reducing unit 22 reduces the original document image. In other words, the image reducing unit 22 performs resolution conversion to the original document image. Note that the image reducing unit 22 reduces the original document image so that the size (i.e., the number of pixels in the vertical and horizontal directions) of the original document image becomes a specific value (e.g., 100 pixels in the vertical direction and 100 pixels in the horizontal direction) after reduction.

The noise adding unit 23 generates multiple images for machine learning by adding a noise to an original document image that which has not been reduced by the image reducing unit 22 or to an original document image that has been reduced by the image reducing unit 22 (here, to an original document image that has been reduced).

The noise adding unit 23 generates multiple images for machine learning that are different from each other by adding noises in positional patterns that are different from each other, respectively. For example, the noise adding unit 23 randomly specifies a specific number of noise adding positions and adds noises to the adding positions.

Alternatively, the noise adding unit 23 generates multiple intermediate images by arranging noises in different patterns on an original document image that has not been reduced and generates multiple images for machine learning that are different from each other by reducing the multiple intermediate images, respectively.

Furthermore, in the present embodiment, the noise adding unit 23 generates multiple images for machine learning by adding a pseudo character image to an original document image as the noise described above. The pseudo character image is not a character image but an image in a specific shape and a specific size. For example, an image in a rectangular shape with a fixed density is regarded as a pseudo character image.

Here, in a case where a noise is added to an original document image that has not been reduced by the image reducing unit 22, the "specific size" is any size in a range from the minimum size to the maximum size of a character that can be used in the original document image that has not been reduced. On the other side, in a case where a noise is added to an original document image that has been reduced by the image reducing unit 22, the "specific size" is any size in a range from the minimum size to the maximum size of a character that can be used in the original document image that has been reduced. For example, the "specific size" is set to any value in a range from 1 to 10 percent of the size of an original document image (that has or has not been reduced).

Furthermore, in a case where the density of the above-described position to which a noise is to be added (hereinafter referred to as the adding position) is different from the density of the background (e.g., white color), the noise adding unit 23 may change the adding position to another position having the density of the background. For example, the said another position is randomly selected again.

Figure 3:
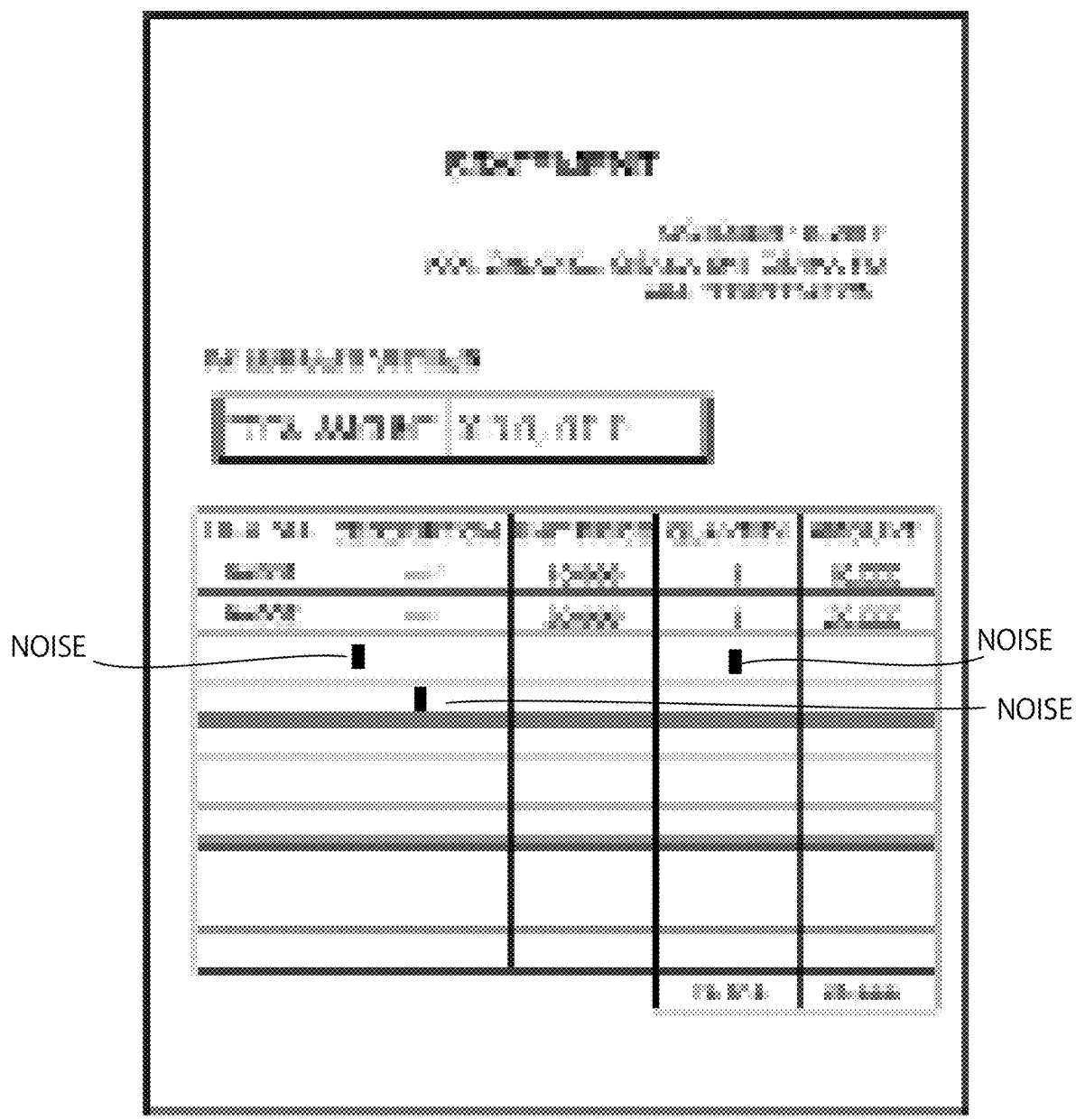
FIG. 3 is a diagram illustrating an example of an image for machine learning corresponding to the filled-in form illustrated in FIG. 2.

FIG. 3 is a diagram illustrating an example of an image for machine learning corresponding to the filled-in form illustrated in FIG. 2. For example, as illustrated in FIG. 3, multiple pseudo character images are added to random positions as noises.

Furthermore, the noise adding unit 23 may add pseudo character images of different aspect ratios to multiple adding positions, respectively.

Furthermore, the noise adding unit 23 may detect a frame in an original document image and add a pseudo character image to the inside of the detected frame. Note that it is possible to detect the frame in an existing method (e.g., edge extraction, pattern matching, etc.).

The label adding unit 24 associates the form type of an original document image with the generated multiple images for machine learning as a label, so as to generate training data for machine learning, which includes the multiple images for machine learning and the form type.

For example, the label adding unit 24 specifies the form type (i.e., statement, receipt, etc.) of an original document image as a label in accordance with a user operation detected by the input device 12.

Further, the form image acquiring unit 25 acquires an image of a filled-in form whose form type is desired to be specified by the classifier 27, to which machine learning has been performed. In the present embodiment, the form image acquiring unit 25 utilizes the image reading device 11 to acquire a form image, which is read from such a filled-in form.

The image reducing unit 26 reduces the acquired image of the filled-in form into a specific size. That is, the image reducing unit 26 reduces the acquired image of the filled-in form into the same size as the images for machine learning, that have been used for machine learning. That is, the image reducing unit 26 performs resolution conversion to an image of a filled-in form.

The classifier 27 is a classifier to which a reduced image of a filled-in form is input and from which a form type is output. Further, the classifier 27 specifies the form type corresponding to the reduced image of the filled-in form.

The classifier 27 includes a neural network (e.g., a deep neural network) to which machine learning has been performed and specifies the form type corresponding to an image of a filled-in form using the neural network. As the neural network, for example, an existing convolution neural network such as VGG 16 may be used.

The form processing unit 28 performs specific processing to an image of a filled-in form in accordance with a form type specified by the classifier 27. For example, the form processing unit 28 stores an image file of a filled-in form in a folder corresponding to the form type.

The parameter setting unit 29 acquires a parameter after machine learning, which is specified by the machine learning processing unit 32, from the machine learning processing unit 32 and sets the parameter to the classifier 27.

Further, the server apparatus 3 in FIG. 3 may be a cloud server, a server connected to a local network, or the like, and includes a communication device 31 and a machine learning processing unit 32.

The communication device 31 is a device such as a network interface, which is connected to the network 2 and performs data communication with another apparatus (such as the image processing apparatus 1).

The machine learning processing unit 32 executes machine learning of the classifier 27 using the above-described multiple images for machine learning and label as training data.

Specifically, the machine learning processing unit 32 executes machine learning of the classifier 27 by optimizing a parameter (i.e., a coupling coefficient between neurons, a bias of a neuron, etc.) of the classifier 27, which serves as a neural network, based on training data in an existing deep learning method.

Note that, although there is only one image processing apparatus 1 in FIG. 1, the system may include multiple image processing apparatuses 1. Further, to the classifiers 27 of the respective image processing apparatuses 1, the machine learning processing unit 32 may perform machine learning at once or may perform machine learning separately.

Next, an explanation is given of operation of the above-described system.

In the above-described system, machine learning of form types is performed. Further, in the image processing apparatus 1, classification of form images is performed by the classifier 27, to which machine learning has been performed.

(a) Machine Learning of Form Types

Figure 4:
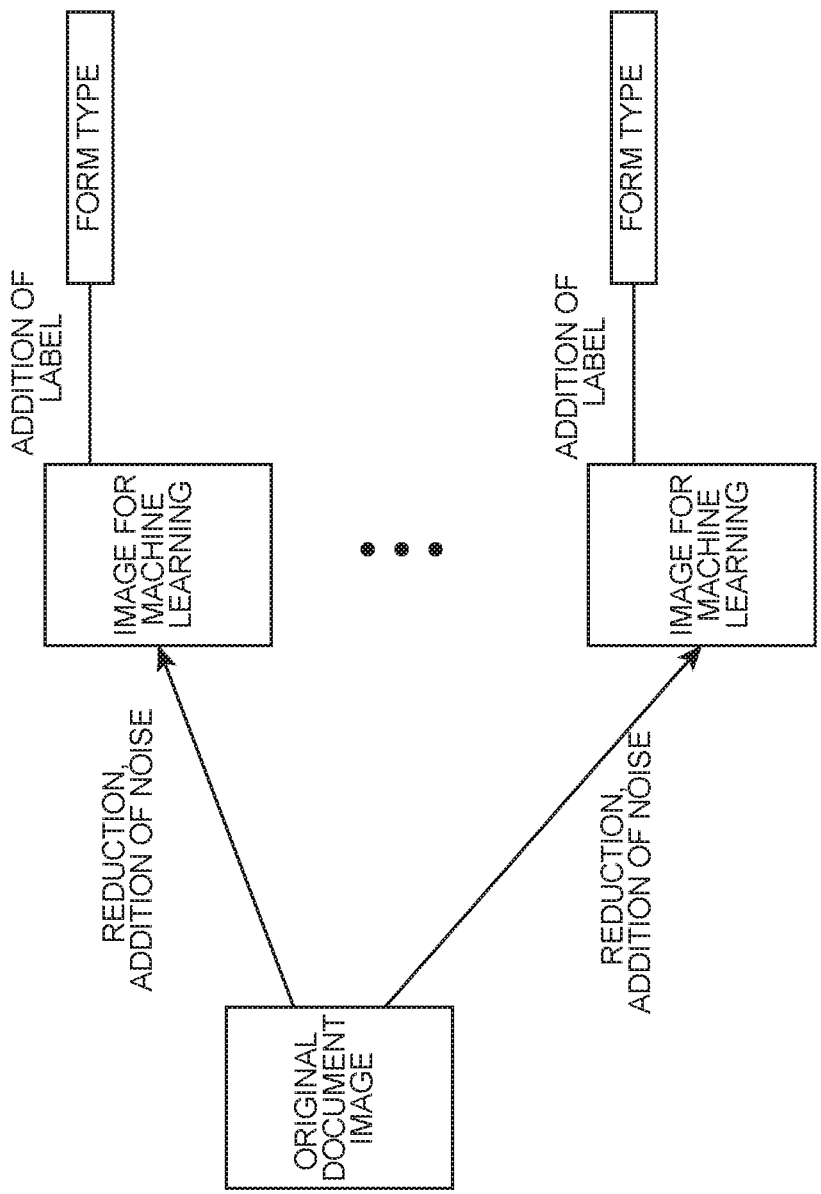
FIG. 4 is a diagram for explaining machine learning of form types in the form type learning system illustrated in FIG. 1.

FIG. 4 is a diagram for explaining machine learning of form types in the form type learning system illustrated in FIG. 1.

First, filled-in forms (e.g., a business form, etc.) of multiple form types to be used for machine learning are prepared. Then, the original document image acquiring unit 21 utilizes the image reading device 11 to acquire an image (i.e., form image) of a filled-in form.

The image reducing unit 22 reduces the form image into a specific size and the noise adding unit 23 adds noises to the form image, which has been reduced, in different patterns as described above, so as to generate multiple images for machine learning.

The label adding unit 24 adds the form type of the filled-in form to the multiple images for machine learning as a label.

The machine learning processing unit 32 acquires the multiple images for machine learning and the form type as training data and performs machine learning of the classifier 27 by executing processing of optimizing a parameter of the classifier 27 such that each of the images for machine learning is input and the corresponding form type is output.

After completion of machine learning, the parameter setting unit 29 acquires the parameter, to which machine learning has been performed, from the machine learning processing unit 32 of the server apparatus 3 and sets the parameter to the classifier 27.

(b) Classification of Form Images

The form image acquiring unit 25 utilizes the image reading device 11 to acquire an image (i.e., form image) of a filled-in form, which should be classified according to the form type.

The image reducing unit 26 reduces the acquired form image into a specific size.

The classifier 27 specifies the form type corresponding to the reduced form image.

The form processing unit 28 performs specific processing, which corresponds to the specified form type, to the acquired form image.

As described above, according to the above-described embodiment, the image processing apparatus 1 specifies the form type of a filled-in form by use of the classifier 27 that accepts an image of the filled-in form, which has been reduced into a specific size, as an input and outputs a form type as an output. Furthermore, machine learning has been performed to the classifier 27 by the form type learning system and the form type learning system includes: an original document image acquiring unit 21 that acquires an image of a filled-in form as an original document image; an image reducing unit 22 that reduces the original document image; a noise adding unit 23 that adds a noise to the original document image, which has not been reduced by the image reducing unit 22 or has been reduced by the image reducing unit 22, to generate multiple images for machine learning; a label adding unit 24 that associates the form type of the original document image with the multiple images for machine learning as a label; and a machine learning processing unit 32 that performs machine learning of the classifier 27 using the multiple images for machine learning and the label as training data.

As a result, form classification is accurately performed without using form layout information. Moreover, the above-described noise addition makes it difficult for contents of a form to be reflected in machine learning, and makes it easier to perform machine learning of a layout, which is unique to the form excluding the contents. Therefore, with less influence of the contents, it is more likely that forms are accurately classified.

Note that various changes and modifications to the above-described embodiment should be apparent to those skilled in the art. Such changes and modifications may be made without departing from the gist and scope of the subject matter and without diminishing intended advantages. That is, it is intended that such changes and modifications are included within the scope of the claims.

For example, in the above-described embodiment, the original document image acquiring unit 21, the image reducing unit 22, the noise adding unit 23, and the label adding unit 24 may be provided in a device that is different from that of the form image acquiring unit 25, the image reducing unit 26, the classifier 27, the form processing unit 28, and the parameter setting unit 29.

Further, in the above-described embodiment, the machine learning processing unit 32 is provided in the server apparatus 3, which is different from the image processing apparatus 1. However, the machine learning processing unit 32 may be provided in the image processing apparatus 1.

Furthermore, in the above-described embodiment, in a case where the density of the above-described adding position is different from the density of the background (e.g., white color), the noise adding unit 23 may convert the pseudo character image into white color and add the converted pseudo character image to the adding position.

Furthermore, in the above-described embodiment, one of the original document image acquiring unit 21 and the form image acquiring unit 25 may be used instead of the other. In this case, one of the original document image acquiring unit 21 and the form image acquiring unit 25 may be omitted. Further, in the above-described embodiment, one of the image reducing units 22 and 26 may be used instead of the other. In this case, one of the image reducing units 22 and 26 may be omitted.

For example, the present disclosure is applicable to a multifunction peripheral.

What is claimed is:

1. A form type learning system comprising:
an original document image acquiring unit that acquires an image of a filled-in form as an original document image;
an image reducing unit that reduces the original document image;
a noise adding unit that adds a noise to the original document image to generate a plurality of images for machine learning, the original document image having not been reduced by the image reducing unit or having been reduced by the image reducing unit;
a label adding unit that associates a form type of the original document image with the plurality of images for machine learning as a label; and
a machine learning processing unit that performs machine learning of a classifier using the plurality of images for machine learning and the label as training data,
wherein the classifier accepts an image of a filled-in form as an input and outputs a form type.

2. The form type learning system according to claim 1, wherein the noise adding unit adds a pseudo character image to the original document image as the noise to generate the plurality of images for machine learning, and
wherein the pseudo character image is in a specific shape and a specific size.

3. The form type learning system according to claim 2, wherein the specific size is any size in a range from a minimum size to a maximum size of a character that can exist in the original document image, which has not been reduced the image reducing unit or has been reduced by the image reducing unit.

4. The form type learning system according to claim 2, wherein the noise adding unit adds the pseudo character image of different aspect ratios to a plurality of adding positions, respectively.

5. The form type learning system according to claim 2, wherein the noise adding unit detects a frame in the original document image and adds the pseudo character image to an inside of the detected frame.

6. The form type learning system according to claim 1, wherein the noise adding unit randomly specifies an adding position of the noise and, in a case where a density of the specified adding position is different from that of a background, the noise adding unit changes the adding position to another position having the density of the background.

7. An image processing apparatus comprising:
- a form image acquiring unit that acquires an image of a filled-in form;
- an image reducing unit that reduces the acquired image of the filled-in form into a specific size; and
- a classifier that accepts the reduced image of the filled-in form as an input and outputs a form type, wherein machine learning has been performed to the classifier by a form type learning system, and wherein the form type learning system includes: an original document image acquiring unit that acquires an image of a filled-in form as an original document image; an image reducing unit that reduces the original document image; a noise adding unit that adds a noise to the original document image, which has not been reduced by the image reducing unit or has been reduced by the image reducing unit, to generate a plurality of images for machine learning; a label adding unit that associates a form type of the original document image with the plurality of images for machine learning as a label; and a machine learning processing unit that performs machine learning of the classifier using the plurality of images for machine learning and the label as training data.

* * * * *